US012768630B2

(12) United States Patent
Clark et al.

(10) Patent No.: US 12,768,630 B2

(45) Date of Patent: Oct. 20, 2026

(54) MEASUREMENT TOOL FOR A BRAKE AND RELATED BRAKE ASSEMBLY AND ASSEMBLY METHOD

(71) Applicant: Westlake Royal Building Products (USA) Inc., Columbus, OH (US)

(72) Inventors: Adam C. Clark, Grand Blanc, MI (US); Nathan D. Greenway, Attica, MI (US); Christopher G. Miller, Dryden, MI (US)

(73) Assignee: Westlake Royal Building Products (USA) Inc., Columbus, OH (US)

( * ) Notice: Subject to any disclaimer, the term of this patent is extended or adjusted under 35 U.S.C. 154(b) by 343 days.

(21) Appl. No.: 18/667,702

(22) Filed: May 17, 2024

(65) Prior Publication Data

US 2024/0384975 A1 Nov. 21, 2024

Related U.S. Application Data

(60) Provisional application No. 63/467,107, filed on May 17, 2023.

(51) Int. Cl.

| | |
|---|---|
| ***G01B 3/04*** | (2006.01) |
| ***B21D 28/26*** | (2006.01) |

(52) U.S. Cl.

CPC ............... *G01B 3/04* (2013.01); *B21D 28/26* (2013.01)

(58) Field of Classification Search

CPC ............. G01B 3/04; G01B 3/14; B21D 28/26

(Continued)

(56) References Cited

U.S. PATENT DOCUMENTS

| | | | | |
|---|---|---|---|---|
| 3,702,502 A * | 11/1972 | Kelleher | B21D 37/12 | 33/627 |
| 3,926,028 A * | 12/1975 | Kowal | B21D 7/063 | 72/388 |

(Continued)

FOREIGN PATENT DOCUMENTS

| | | |
|---|---|---|
| CA | 2814923 A1 | 8/2014 |
| CA | 159978 S | 4/2015 |

(Continued)

OTHER PUBLICATIONS

ALUM-A-BRAKE, Your Scaffolding, Brake and Vinyl Coil Answer, https://alumapole.com/brake.html, 2 pages, Sep. 28, 2022, USA.

(Continued)

*Primary Examiner* — George B Bennett

(74) *Attorney, Agent, or Firm* — Standley Law Group LLP; Jeffrey S. Standley; Jeffrey C. Norris

(57) ABSTRACT

A measurement tool comprising a base portion that is adapted to be positioned over an upper clamping portion of a brake, wherein an elongated portion of the measurement tool extends from the base portion to facilitate measurement of material to be bent or cut by the brake. In one exemplary installation method, a base portion of an exemplary embodiment of the measurement tool may simply be clipped onto a rear edge of an upper clamping portion, which may be done manually without compromising the brake with holes. Furthermore, in an exemplary removal method, a base portion of an exemplary embodiment of the measurement tool may simply be unclipped from the brake, which again may be done manually without compromising the brake.

18 Claims, 4 Drawing Sheets

(58) Field of Classification Search
USPC .......................................... 33/501, 626, 833
See application file for complete search history.

(56) References Cited

U.S. PATENT DOCUMENTS

| | | | | |
|---|---|---|---|---|
| 4,654,975 | A * | 4/1987 | Lopez | B25C 7/00 33/646 |
| 4,660,293 | A * | 4/1987 | Kovacs | G01B 3/56 33/495 |
| 5,761,939 | A | 6/1998 | Spencer et al. | |
| 6,748,783 | B1 | 6/2004 | Chubb et al. | |
| 7,021,096 | B2 | 4/2006 | Barnett | |
| 7,043,950 | B2 | 5/2006 | Clark et al. | |
| 7,412,862 | B2 | 8/2008 | Anderson et al. | |
| 7,546,692 | B2 * | 6/2009 | Simko | E04F 21/1855 33/647 |
| 8,925,215 | B2 * | 1/2015 | Drasovean | G01B 5/25 33/701 |
| 9,079,233 | B2 * | 7/2015 | Cloutier | B21D 5/042 |
| D747,589 | S | 1/2016 | Cloutier | |
| D781,022 | S | 3/2017 | Cloutier | |
| D799,140 | S | 10/2017 | Cloutier | |
| D799,777 | S | 10/2017 | Cloutier | |
| 9,968,976 | B2 * | 5/2018 | Klinger | B21D 7/063 |
| 10,590,663 | B1 * | 3/2020 | Meeks | E04F 21/1855 |
| 2003/0088992 | A1 * | 5/2003 | Nelson | E04D 15/04 33/640 |
| 2005/0016236 | A1 | 1/2005 | Clark et al. | |
| 2006/0191309 | A1 | 8/2006 | Anderson et al. | |
| 2014/0223754 | A1 | 8/2014 | Cloutier | |
| 2020/0056382 | A1 | 2/2020 | Cloutier | |
| 2020/0122211 | A1 | 4/2020 | Hershberger | |

FOREIGN PATENT DOCUMENTS

| | | | | |
|---|---|---|---|---|
| CA | 3014100 | A1 | 2/2020 | |
| CA | 3052012 | A1 | 2/2020 | |
| CN | 218396219 | U | 1/2023 | |
| WO | WO-2018154549 | A2 * | 8/2018 | B21D 11/12 |

OTHER PUBLICATIONS

ALUM-A-BRAKE, 10'6" Alum-A-Brake—Ultima Plus—Work 3 to 5 Times Faster, https://www.youtube.com/watch?v=9b65CFMUTYk, 1 Page, Nov. 16, 2018, USA.

Van Mark the Mark of Quality, Bending & Cutting for Roofing, Siding and Windows, 16 pages, F547 May 3, 2022, Farmington Hills, MI, USA.

Tapco Tools, Max-I-Mum XL System, TapcoTools.com, 16 pages, USA.

Tapco Tools, PRO Cut-Off Guage, http.tapcotools.com/products/accessories/pro-cut-off-gauge. 5 pages, USA.

* cited by examiner

Known Art brake assembly
upper clamp portion
anvil portion
10
12
14
16
18
18C
20
20A
20B

MEASUREMENT TOOL FOR A BRAKE AND RELATED BRAKE ASSEMBLY AND ASSEMBLY METHOD

This application is a continuation of U.S. Patent Application No. 63/467,107, filed May 17, 2023, which is hereby incorporated by reference in its entirety.

BACKGROUND AND SUMMARY OF THE INVENTION

Exemplary embodiments of the present invention relate generally to brakes and brake assemblies that are adapted to be used to bend or cut material.

Brakes and brake assemblies may be used to bend or cut aluminum sheet material in order to form various siding and trim pieces. Brake assemblies may include accessories to facilitate the bending and cutting processes. In a known example, a measurement tool is secured to a moving hinge of a brake assembly, such that the measurement tool is positioned beneath the material to be bent or cut. A known measurement tool requires a lengthy and difficulty installation onto the brake and also to remove from the brake. In particular, a known measurement tool is comprised of a steel base that must be screwed to the moving hinge, wherein a magnetic scale extends from the steel base. This requires the drilling of holes in the metal moving hinge. Furthermore, in order to be able to cut or bend the material, the measurement tool must be unscrewed from the moving hinge, which is again cumbersome and also leaves the holes in the moving hinge. Additionally, the bulky steel base and magnetic scale of the known measurement tool makes the brake assembly (particularly the anvil) heavy, which may also make the brake assembly cumbersome to operate or transport.

An exemplary embodiment of the present invention may address any of aforementioned shortcomings of the known art. One exemplary embodiment is a measurement tool comprising a base portion that is adapted to be positioned over an upper clamping portion of a brake, wherein an elongated portion of the measurement tool extends from the base portion to facilitate measurement of material to be bent or cut. In one exemplary installation method, a base portion of an exemplary embodiment of the measurement tool may simply be clipped onto a rear edge of an upper clamping portion, which may be done manually without compromising the brake with holes. Furthermore, in an exemplary removal method, a base portion of an exemplary embodiment of the measurement tool may simply be unclipped from the brake, which again may be done manually without compromising the brake. Moreover, an exemplary embodiment of a measurement tool may be lighter and more cost effective relative to the aforementioned known measurement tool due to its installation over an upper clamping portion of a brake, which more effectively supports the measurement tool.

An exemplary embodiment of a measurement tool may also comprise a material stop positioned on an elongated portion to facilitate measurement of material to be bent or cut. In one example, a material stop may be slidably positioned on an elongated portion to select a measurement of material to be bent or cut. An exemplary embodiment of a material stop may comprise a fastening device to set a desired position of the measurement tool on an elongated portion. Moreover, an exemplary embodiment of a material stop may be selectively positioned (e.g., initially or after initial installation) on an elongated portion to facilitate operation of a fastening device by a left-handed person or a right-handed person. In an exemplary operation, material may be abutted against a material stop to set a desired length of material to be bent or cut.

An exemplary embodiment of a measurement tool may also comprise a pivot portion adapted to facilitate movement of the measurement tool to facilitate a bending or cutting process. One example of a pivot portion is a hinge, but may comprise other types of pivot mechanisms. While, as aforementioned, an exemplary embodiment of a measurement tool may simply be removed from an upper clamping portion of a brake as needed, an exemplary embodiment of a pivot portion may obviate the need for removal. In particular, an exemplary embodiment of a pivot portion may facilitate rotation of a measurement tool out of the way for a bending or cutting process. More particularly, an exemplary embodiment of a pivot portion may facilitate vertical rotation of a measurement tool over an upper clamping portion. Still more particularly, an exemplary embodiment of a pivot portion may facilitate vertical rotation of a measurement tool over an anvil portion of an upper clamping portion.

Exemplary embodiments also include related brake assemblies and methods for installing a measurement tool. While exemplary embodiments may be particularly useful for bending or cutting aluminum sheet metal into siding and trim pieces, other exemplary embodiments may be useful for other types of material or end uses unless otherwise noted.

In addition to the novel features and advantages mentioned above, other benefits will be readily apparent from the following descriptions of the drawings and exemplary embodiments.

DETAILED DESCRIPTION OF EXEMPLARY EMBODIMENTS

Figure 1:
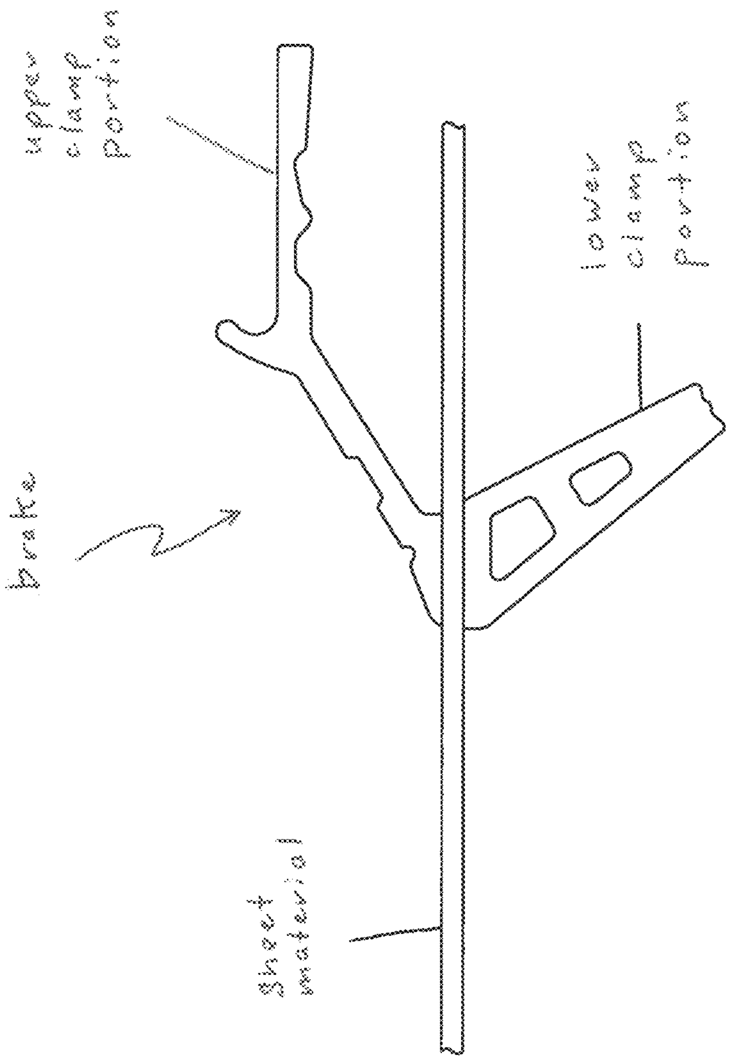
FIG. 1 is a side elevation view of an exemplary embodiment of a known brake comprising opposing clamp portions, wherein an example of a sheet of material being held between the opposing clamp portions is shown (wherein portions of the brake are not shown for clarity).

Exemplary embodiments of the present invention are directed to a measurement tool that is adapted to facilitate the measurement of material that is to be bent or cut by a brake. FIG. 1 shows an example of a known brake or brake assembly comprising opposing clamp portions, commonly an upper clamp portion (which may also be referred to as an anvil) and a lower clamp portion, wherein an example of a sheet of material is held between the opposing clamp portions such that it may be bent or cut by the brake (portions of a brake assembly that are adapted to bend or cut the piece of material are not shown for clarity). Unless otherwise expressly set forth, exemplary embodiments of a measurement tool may be adapted to be used with a different brake. Brakes are commonly used to bend or cut sheet metal (e.g., aluminum). However, unless otherwise expressly set forth, it is not intended to limit an exemplary embodiment of a measurement tool to the type of material that is to be measured.

Figure 2:
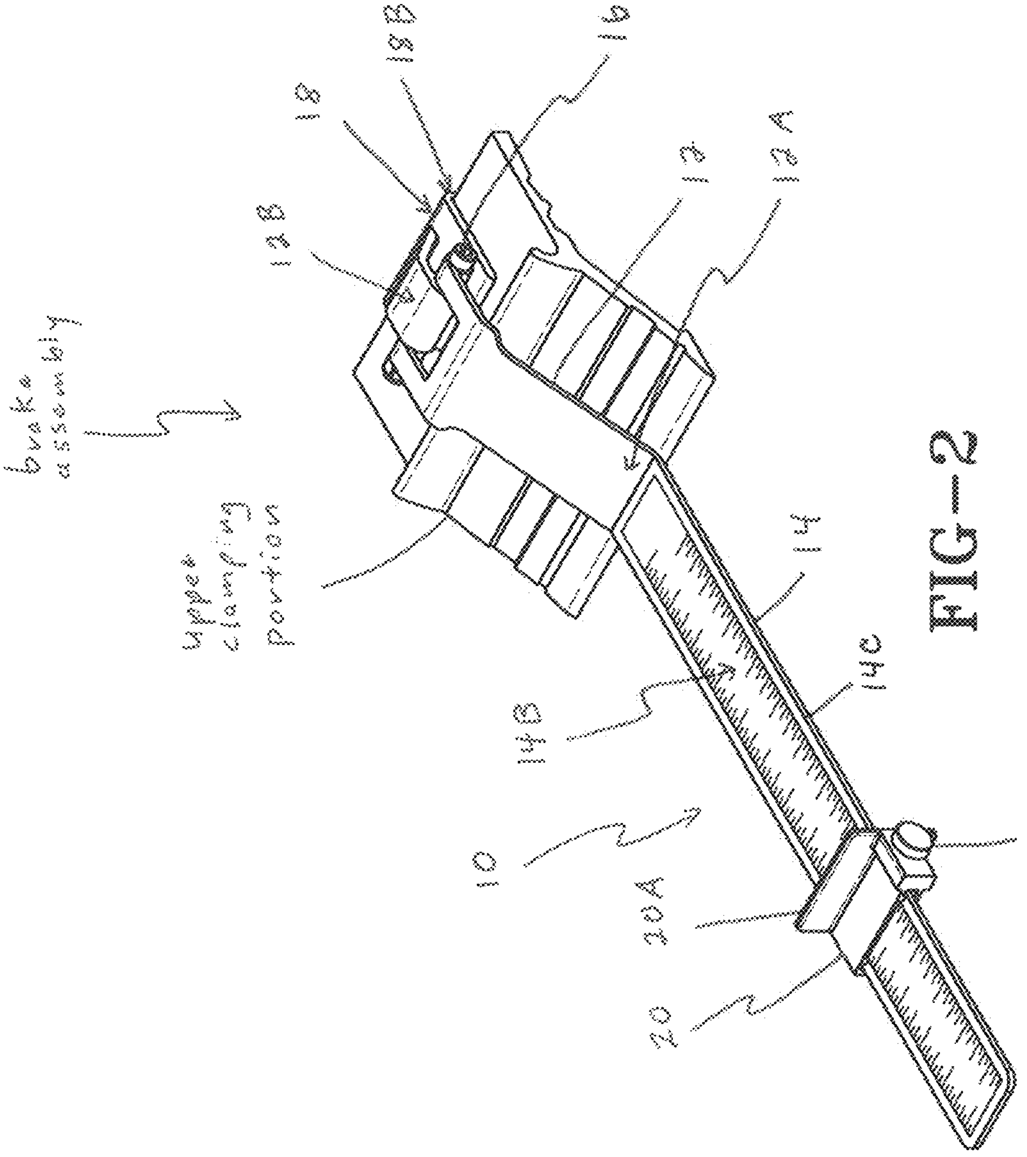
FIG. 2 is a perspective view of an exemplary embodiment of a measurement tool, wherein the measurement tool is shown installed on the upper clamping portion of FIG. 1 to form an exemplary embodiment of a brake assembly (wherein portions of the brake are not shown for clarity).
Figures 3, 4, 5:
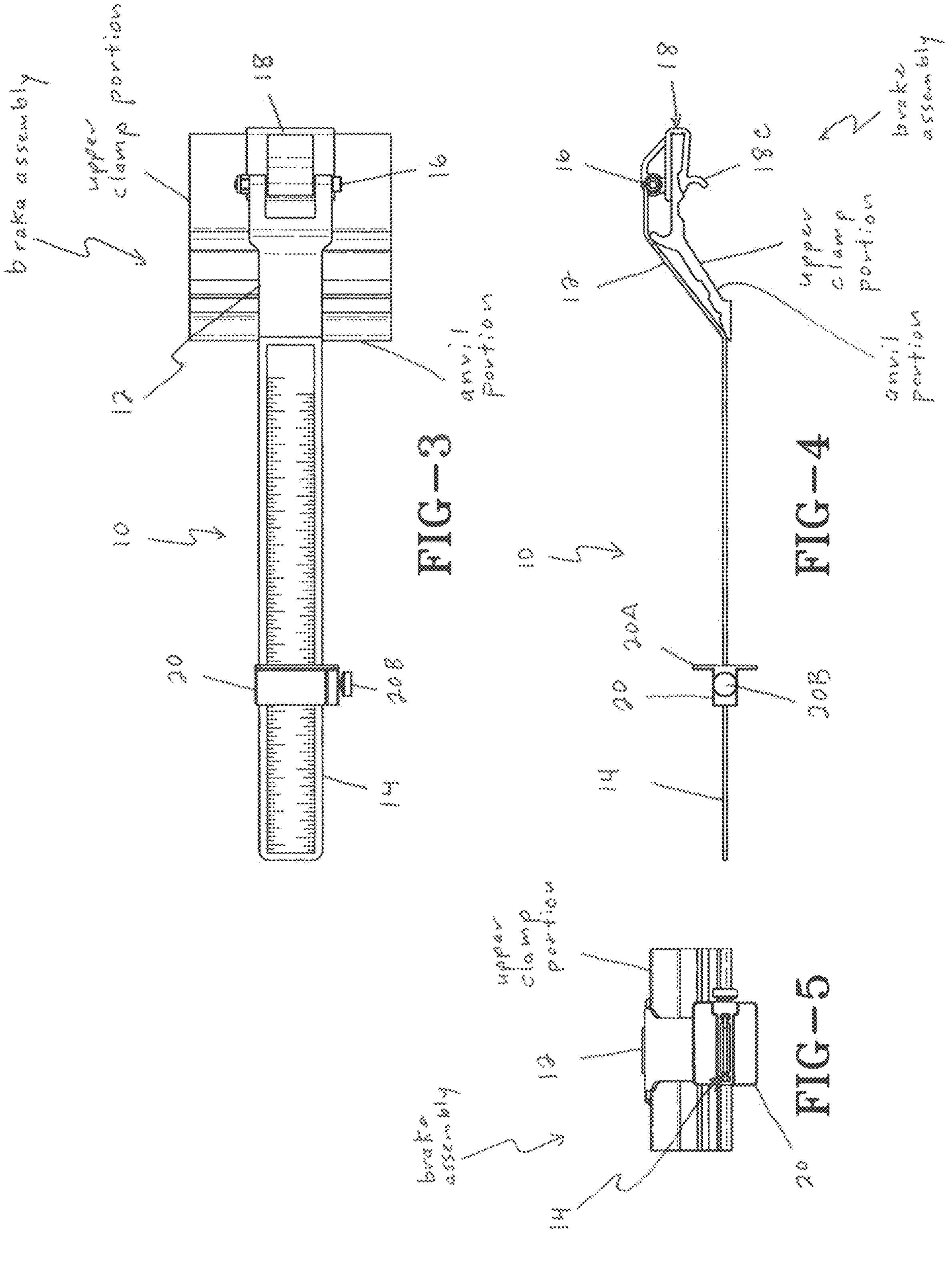
FIG. 3 is a top plan view of the measurement tool and brake assembly of FIG. 2.
FIG. 4 is a side elevation view of the measurement tool and brake assembly of FIG. 2.
FIG. 5 is an end elevation view of the measurement tool and brake assembly of FIG. 2.

FIGS. 2-6 show an exemplary embodiment of a measurement tool 10. In FIGS. 2 and 3, measurement tool 10 is shown installed on the upper clamp portion of FIG. 1 to form an exemplary embodiment of a brake assembly (wherein portions of the brake are not shown for clarity). A measurement tool 10 may or may not be considered to be included in a brake assembly. By being adapted to be installed on an upper clamp portion, a measurement tool is adapted to extend over a piece of material that is to be bent or cut to allow for measurement.

Measurement tool 10 comprises a base portion 12 that is adapted to extend or be positioned over (i.e., above) an upper clamp portion (or equivalent) of a brake when installed. An elongated portion 14 is adapted to measure a piece of material that is adapted to be bent or cut by a brake. For this purpose, elongate portion 14 comprises a a desired scale 14B on at least one side of elongated portion 14.

In an exemplary embodiment, an elongated portion extends from a distal portion or end 12A of base portion 12 and away from an upper clamp portion (or equivalent). However, in other exemplary embodiments, an elongated portion may extend from another portion of a base portion. Additionally, elongated portion 14 is also adapted to extend above material that is adapted to be held between an upper clamp portion and the lower clamp portion of a brake.

Figure 6:
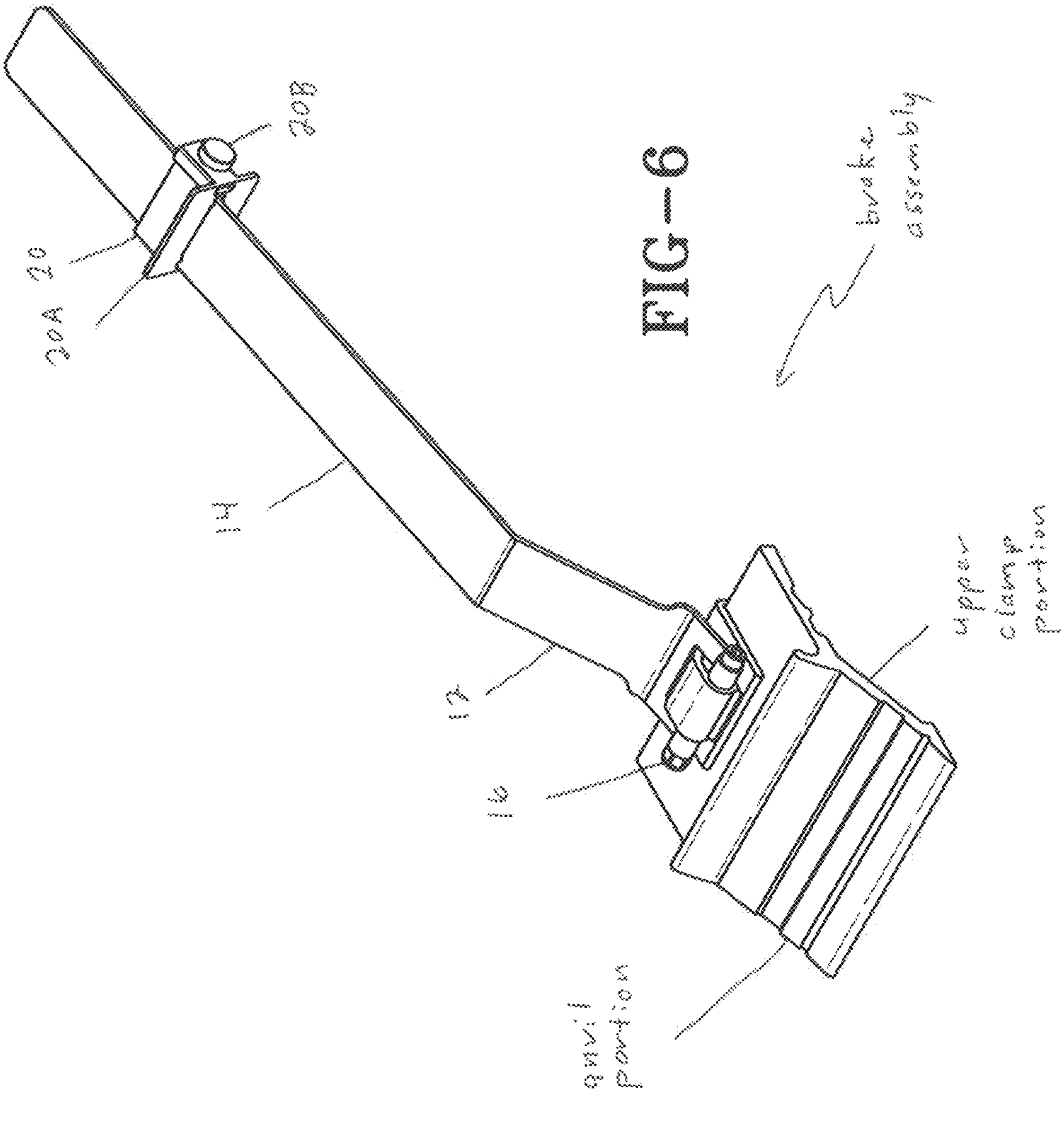
FIG. 6 is a perspective view of the measurement tool and brake assembly of FIG. 2, wherein the measurement tool is shown in an exemplary rotated position to facilitate a bending or cutting process using the brake assembly.

This example of base portion 12 may also comprise a pivot portion 16 adapted to facilitate movement of measurement tool 10 to facilitate a bending or cutting process (e.g., with respect to material adapted to be held between an upper clamping portion and a lower clamping portion of the brake. In particular, pivot portion 16 is adapted to facilitate movement of base portion 12 and elongated portion 14 such as shown in FIG. 6. To do so, this example of pivot portion is located at a proximal portion 12B of base portion 12. However, in other exemplary embodiments, a pivot portion may be located at a different portion (e.g., an intermediate or distal portion) of a base portion.

In this embodiment, pivot portion 16 is adapted to facilitate rotation of measurement tool 20 over an upper clamping portion of a brake to facilitate a bending or cutting process with respect to material adapted to be held between the upper clamping portion and a lower clamping portion of the brake. More particularly, pivot portion 16 is adapted to facilitate vertical rotation of measurement tool 20 over an upper clamping portion of a brake (e.g., adapted to facilitate vertical rotation of measurement tool 20 away from an anvil portion of an upper clamping portion of the brake. Other embodiments of a pivot portion may be adapted to facilitate different types of movement of a measurement tool.

This example of base portion 12 may also comprise a clip portion 18 that is adapted to facilitate positioning of base portion 12 on an upper clamp portion of a brake. In this example, clip portion 18 is part of the proximal portion of 12B of base portion 12, and is associated with pivot portion 16 to facilitate rotation of elongated portion 14 and a portion of base portion 12. In other embodiments, a clip portion may be located at a different portion (e.g., an intermediate or distal portion) of a base portion. In this example, clip portion 18 comprises a U-shaped portion 18B that is adapted to extend around an edge of an upper clamp portion. Also, in other embodiments, a base portion may comprise a different type of attachment portion (e.g., magnetic, clamping, suction, etc.), or may not comprise an attachment portion (e.g., such that a measurement tool is adapted to simply rest on an upper clamp portion or otherwise be associated with brake).

In this example, clip portion 18 is further adapted to engage a bottom side of the upper clamp portion of the brake such as best shown in FIG. 4, which may facilitate a firm position on the upper clamp portion. Additionally, in this embodiment, a flange 18C extends from said U-shaped portion 18B that may facilitate removal of measurement tool 10 from an upper clamp portion when not in use.

This example of measurement tool 10 may also comprise a material stop 20. In this example, material stop 20 is adapted to be slidably positioned on elongated portion 14 such that a desired length of material is adapted to abut material stop 20 to facilitate bending or cutting of the material. Other embodiments of a material stop may be positioned relative to an elongated portion in a different manner. This embodiment of material stop 20 has a planar surface 20A that is adapted to abut a piece of material that is to be bent or cut by a brake. Furthermore, planar surface 20A is adapted to facilitate measurement. In particular, material stop 20 is adapted to be set relative to scale 14B on elongated portion 14 to facilitate determination of a length of material adapted to be held between the upper clamping portion and the lower clamping portion of the brake from planar surface 20A to an upper clamping portion of a brake. However, other embodiments of a material stop may have a different shape of a surface that is adapted to abut a piece of material that is to be bent or cut by a brake and/or to facilitate measurement.

This embodiment of material stop 20 also comprises a fastening device 20B adapted to secure material stop 20 to elongated portion 14. In particular, fastening device 20B is a thumb screw that is adapted to engage a lateral side 14C of elongated portion 14 on which there is not a scale. Other embodiments of a fastening device may be adapted to engage a different portion (e.g., bottom) of an elongated portion. Also, other embodiments of a fastening device may comprise a different fastener or may not comprise a fastening device (e.g., magnetic).

This embodiment of material stop 20 is also adapted to be selectively positioned on elongated portion 14 to facilitate operation of fastening device 20B by a left-handed person or a right-handed person. For instance, FIG. 3 shows an example of a position of material stop 20 to facilitate operation of fastening device 20B by a right-handed person. Material stop 20 may be rotated 180-degrees or reversed (e.g., initially or after initial installation) relative to elongated portion 14 to facilitate the desired side of operation. However, some embodiments of material stop may not be adapted to be selectively positioned for operation by a left-handed person or a right-handed person.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A measurement tool adapted for use on a brake that is adapted to facilitate cutting or bending of material that is adapted to held between an upper clamping portion and a lower clamping portion of the brake, said measurement tool comprising:

a base portion adapted to be positioned over an upper clamping portion of a brake, said base portion comprising a pivot portion adapted to facilitate movement of said measurement tool;

an elongated portion extending from said base portion; and a material stop adapted to be slidably positioned on said elongated portion such that a desired length of material is adapted to abut said material stop to facilitate bending or cutting of the material;

wherein said pivot portion is adapted to facilitate movement of said measurement tool to facilitate a bending or cutting process with respect to material adapted to be held between the upper clamping portion and the lower clamping portion of the brake.

2. The measurement tool of claim 1 wherein said material stop comprises a fastening device adapted to secure said material stop to said elongated portion.

3. The measurement tool of claim 2 wherein said fastening device is a thumb screw.

4. The measurement tool of claim 2 wherein said elongated portion comprises a scale on at least one side of said elongated portion.

5. The measurement tool of claim 4 wherein said fastening device is adapted to engage a side of said elongated portion on which there is not a scale.

6. The measurement tool of claim 4 wherein said material stop is adapted to be set relative to said scale on said elongated portion to facilitate determination of a length of material adapted to be held between the upper clamping portion and the lower clamping portion of the brake from said material stop to the upper clamping portion of the brake.

7. The measurement tool of claim 6 wherein said elongated portion is adapted to extend above material that is adapted to be held between the upper clamping portion and the lower clamping portion of the brake.

8. The measurement tool of claim 2 wherein said material stop is adapted to be selectively positioned on said elongated portion to facilitate operation of said fastening device by a left-handed person or a right-handed person.

9. The measurement tool of claim 1 wherein said elongated portion comprises a scale on at least one side of said elongated portion.

10. The measurement tool of claim 9 wherein said material stop is adapted to be set relative to said scale on said elongated portion to facilitate determination of a length of material adapted to be held between the upper clamping portion and the lower clamping portion of the brake from said material stop to the upper clamping portion of the brake.

11. The measurement tool of claim 1 wherein said elongated portion is adapted to extend above material that is adapted to be held between the upper clamping portion and the lower clamping portion of the brake.

12. The measurement tool of claim 1 wherein said pivot portion is adapted to facilitate rotation of said measurement tool over the upper clamping portion of the brake to facilitate a bending or cutting process with respect to material adapted to be held between the upper clamping portion and the lower clamping portion of the brake.

13. The measurement tool of claim 12 wherein said pivot portion is adapted to facilitate vertical rotation of said measurement tool over the upper clamping portion of the brake.

14. The measurement tool of claim 13 wherein said pivot portion is adapted to facilitate vertical rotation of said measurement tool away from an anvil portion of the upper clamping portion of the brake.

15. The measurement tool of claim 1 wherein said base portion comprises a clip portion adapted to facilitate positioning of said base portion on an upper clamp portion of a brake.

16. The measurement tool of claim 15 wherein said clip portion is associated with said pivot portion to facilitate rotation of said elongated portion and a portion of said base portion.

17. The measurement tool of claim 15 wherein said clip portion comprises a U-shaped portion that is adapted to extend around an edge of the upper clamp portion of the brake.

18. The measurement tool of claim 15 wherein said clip portion is adapted to engage a bottom side of the upper clamp portion of the brake.

* * * * *